Patented Dec. 6, 1949

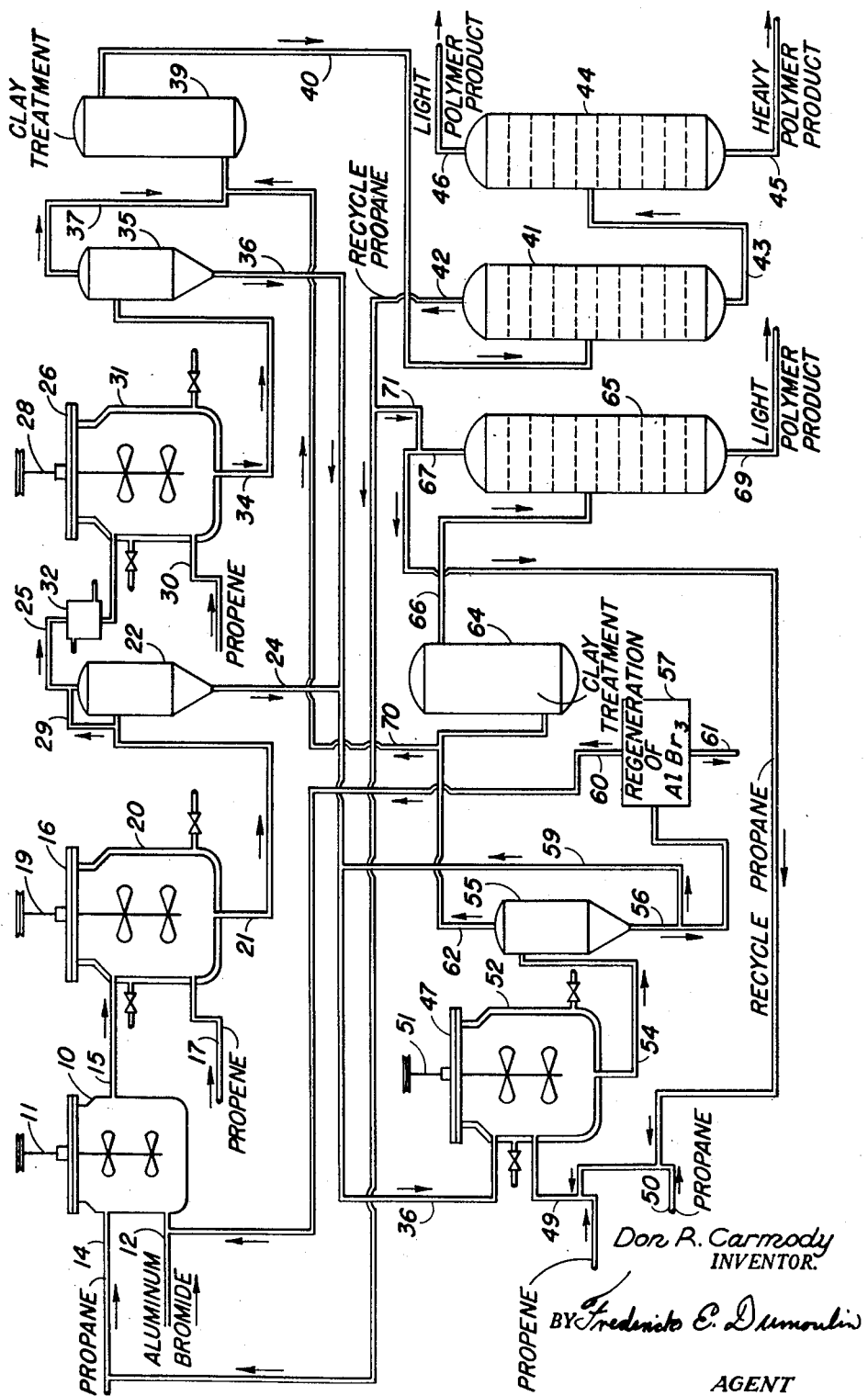

2,490,578

UNITED STATES PATENT OFFICE 2,490,578

HYDROCARBON CONVERSION PROCESS

Don R. Carmody, Dallas, Tex., assignor, by mesne assignments, to Socony-Vacuum Oil Company, Incorporated, New York, N. Y., a corporation of New York Application September 19, 1946, Serial No. 697,962

4 Claims. (Cl. 260—683.15)

This invention relates to the polymerization of olefins and relates more particularly to the polymerization of olefins by the use of dissolved polymerization catalysts.

It is known that various olefins, such as propene, the isomeric butenes, pentenes, etc., may be polymerized in the presence of suitable catalysts to produce polymer products whose viscosity varies from that of very light oils to semi-solid, rubbery compounds, depending upon the particular type of olefin and polymerization catalyst and the temperature of polymerization employed. Particularly useful catalysts are the metal halides such as aluminum chloride, aluminum bromide, etc., and these may be employed in the form of solutions, aluminum chloride being dissolved in an alkyl halide such as ethyl or propyl chloride, and aluminum bromide being dissolved in a saturated hydrocarbon such as propane or normal butane. In carrying out the polymerization reaction using dissolved catalysts, the olefin stream may be added to the solution of catalyst contained within a polymerization reaction zone for batchwise operation or the olefin may be added along with a stream of the dissolved catalyst to a polymerization reaction zone, the reaction mixture being continuously withdrawn after a suitable residence time, for continuous operation. Thereafter, catalyst-hydrocarbon complex is allowed to settle out from the reaction mixture and the remainder of the dissolved catalyst is removed from the reaction mixture either by a water, alcohol, or caustic wash, absorption on clay, or by heating to cause additional complex formation. By washing or absorption, the catalyst is lost and is not recoverable. By heating, the catalyst may be recovered for reuse from the complex, but heating tends to crack the polymer product.

Generally, in either batch or continuous operation, for any given olefin, catalyst, and temperature of polymerization, the viscosity of the polymer product obtained will be low where the catalyst concentration in the reaction mixture is low and high where the catalyst concentration is high. As the reaction progresses, the metal halide catalysts form complexes with the hydrocarbons in the reaction mixture which, although possessing catalytic activity, are not capable of producing high viscosity polymer products. Consequently, as the reaction progresses, the concentration of the highly active dissolved catalyst continually decreases and the polymer product finally obtained will be a mixture of the high viscosity product produced at the beginning of the reaction where the dissolved catalyst concentration was high and the progressively lower viscosity products produced at subsequent stages of the reaction where the active catalyst concentration was progressively lower through formation of catalyst complex.

The final polymer product being a mixture of polymers having viscosities progressively decreasing from high viscosity to low viscosity, clear cut separation by fractionation of the high viscosity polymer is impossible. This is so since the temperatures required for removal of the intermediate viscosity polymers from the high viscosity polymers, even with low pressure fractionation, result in cracking of the high viscosity product. Accordingly, where the high viscosity products are desired, it has been the practice to stop the polymerization reaction before the catalyst concentration has decreased to a point where the low viscosity products begin to form. However, this involves the disadvantage that the reaction mixture still contains an appreciable concentration of active dissolved catalyst, which may be as high as 50 per cent of the original concentration, and, as hereinbefore indicated, is either lost by the procedures of washing or absorption, or recovered by heating with concomitant cracking of the polymer product. Thus, heretofore, high viscosity polymers have been obtained only at the expense of incomplete utilization of the halide catalyst.

It is an object of this invention to obtain substantially complete utilization of dissolved metal halide olefin polymerization catalysts. It is another object of this invention to obtain maximum yields of both low viscosity and high viscosity olefin polymers. It is another object of this invention to obtain maximum yields of both low and high viscosity olefin polymers without appreciable loss of catalyst. It is another object of this invention to obtain practically complete recovery of metal halide polymerization catalyst for reuse. Further objects and advantages of the invention will become apparent from the following description thereof.

In accordance with the invention, polymerization of olefins is effected by first contacting an olefin with dissolved metal halide catalyst at a low temperature to produce high viscosity polymer products, raising the temperature of the reaction mixture and contacting more of the same olefin with the reaction mixture from the low temperature reaction to produce low viscosity polymer products. By this process, the final polymer product obtained contains only high viscosity products an low viscosity products without admixture of intermediate viscosity polymer products, and clear cut separation of low and high viscosity products may be effected without danger of cracking the high viscosity products. The polymerization reaction at the higher temperature may be continued until the catalyst concentration decreases by complex formation to a value below its effective concentration.

Thereafter, the complex may be removed from the reaction mixture and the metal halide catalyst recovered therefrom for reuse. Alternatively, the complex may be employed as catalyst for further high temperature polymerization of more of the same olefin to produce low viscosity products until the activity of the complex has decreased to an extent that it is no longer effective as a polymerization catalyst. The complex may then be removed from the reaction mixture and the metal halide catalyst recovered therefrom for further use. Thus, practically complete utilization of the catalyst is obtained.

The same olefin is employed in all the polymerization stages of the process. The use of one type of olefin in one stage of the process and a different type of olefin in another stage of the process is disclosed and claimed in my copending application, Serial No. 697,961, filed September 19, 1946, now Patent No. 2,458,977.

In carrying out the invention, the low and high temperature reactions may be carried out in separate reaction zones or, if desired, may be carried out in a single reaction zone. Where the latter procedure is employed, olefin may be passed to the reaction zone maintained at the desired temperature until the catalyst concentration decreases to a value such that the viscosity of the polymer product formed begins to decrease below the desired viscosity. Passage of olefin to the reaction zone may then be discontinued and the reaction mixture raised in temperature for the high temperature reaction. Thereafter, passage of the olefin to the reaction zone may be continued, the temperature being maintained at the desired level. The polymerization with hydrocarbon-catalyst complex is carried out in a separate reaction zone since the amount of complex present in the high temperature reaction mixture is insufficient for effective polymerization.

The process of the invention may be employed for the polymerization of various olefins, as, for example, propene, 1-butene, isobutene, 1-pentene, 1-hexene, etc. Generally, any olefin may be employed which will produce polymer products in the low temperature and high temperature polymerization stages having viscosities permitting ready separation. The olefin feed need not be a pure olefin but may be a mixture of olefins, providing, however, that the mixture also will produce polymer products in the low temperature and high temperature stages of the process having viscosities permitting ready separation. Additionally, the olefin feed may contain saturated straight chain hydrocarbons, but the polymerization reaction mixtures are desirably kept free of saturated branched chain hydrocarbons such as isobutane, etc.

The catalyst employed may be any of the solid metallic halides known to be olefin polymerization catalysts and which are soluble in a solvent having no deleterious effect on the polymerization reaction. Examples of such catalysts are aluminum bromide, aluminum chloride, ferric bromide, etc. Aluminum chloride is not readily soluble in hydrocarbons but is soluble in alkyl halides such as ethyl chloride, propyl chloride, etc., in nitromethane, etc., and accordingly the process of the invention may be applied where aluminum chloride is employed in solution in such solvents. Aluminum bromide is soluble in hydrocarbons such as propane, normal butane, cyclohexane, etc., and may be employed dissolved in these and other hydrocarbon solvents in which an aluminum bromide-hydrocarbon complex does not readily form under the conditions of the polymerization. Propane, normal butane, cyclohexane, etc., may also be employed as diluents in the polymerization reaction and the process of the invention is preferably applied where aluminum bromide dissolved in these hydrocarbon solvents is employed since thereby the problem of completely removing non-hydrocarbon solvents from the polymer product is eliminated.

It is necessary to carry out the low temperature and high temperature stages of the reaction at temperatures such that the viscosity of the low temperature product will be sufficiently high, as compared with the viscosity of the high temperature product, to permit ready separation of the two products. Additionally, the high temperature reaction must be carried out at a temperature such that the viscosity of the high temperature product is sufficiently low to permit fractionation from the low temperature products at temperatures that will avoid cracking. Where the viscosity of the products at 210° F. differ by at least 500 Saybolt Universal seconds and the viscosity of the high temperature product at 210° F. is not greater than about 125 Saybolt Universal seconds, separation by fractionation may be readily effected. Preferably, the low temperature stage of the reaction is carried out below about 0° C., such as —30° C., or lower, and the high temperature stage of the reaction is carried out between 0° C. and 75° C. Where the catalyst-hydrocarbon complex is employed for further polymerization of olefin, the reaction is preferably carried out at temperatures between 0° C. and 75° C.

Any suitable concentration of dissolved metallic halide catalyst and ratio of solvent and diluent to olefin may be employed. When employing aluminum bromide as catalyst and saturated hydrocarbons as solvents and diluents, a concentration of between .05 and 3 mols of catalyst per 100 mols of saturated hydrocarbon and a ratio of about 1 to 10 mols of saturated hydrocarbon per mol of olefin will be found satisfactory although higher and lower concentrations and ratios may also be employed. Of course, the concentration of catalyst in the high temperature reaction will be less than in the low temperature reaction because of the formation of complex, and therefore a catalyst concentration must be selected for the low temperature reaction sufficiently high to provide for an effective concentration of catalyst for the high temperature reaction.

Following completion of the low temperature and high temperature stages of the reaction, the catalyst-hydrocarbon complex is removed from the reaction mixture. This may be accomplished by means of gravity settling or centrifuging. Thereafter, the metal halide catalyst may be removed from the complex for reuse, any suitable procedure known to the art being employed for this purpose. A suitable procedure for removing aluminum bromide from the complex comprises destructive distillation of the complex to vaporize the aluminum bromide therefrom followed by condensation of the vaporized catalyst.

In place of removing the catalyst from the complex following the low temperature and high temperature stages of the reaction, the complex may be employed, as hereinbefore indicated, for further polymerization of olefin. The complex is catalytically active for the polymerization of olefins but its activity is less than that of the dissolved catalyst per se. Accordingly, the polymerization reaction employing the complex as catalyst is preferably carried out at higher temperatures of polymerization, preferably between 0° C. and 75° C., as indicated above. The complex, after removal from the reaction mixture, may be passed to a suitable polymerization reactor, as, for example, a stirring reactor or a packed column, and therein contacted with a stream of olefin, a suitable hydrocarbon diluent for the reaction, such as those previously mentioned, being provided. For carrying out the polymerization reaction, ratios of 4 to 80 pounds of olefin per pound of complex may be employed depending upon the activity of the complex. Contact times to be employed will also depend upon the activity of the complex and as high as 30 minutes for low activity complex. Following this reaction, the complex may be removed from the reaction mixture and the catalyst recovered therefrom for reuse.

The reaction mixture from the low and high temperature stages of the reaction, after removal of complex, may be treated for the removal of any dissolved catalyst that may not have been converted to complex in the high-temperature stage of the reaction. Removal of any such catalyst may be accomplished by washing the reaction mixture with water, caustic, or alcohol, or by treating the reaction mixture with a clay such as bentonite. Preferably, the reaction products are treated with clay even if a water, caustic, or alcohol wash has been employed in order to remove any traces of complex or other undesirable impurities which may not otherwise have been removed. Thereafter, the reaction mixture may be stripped to remove the diluent and solvent employed in the polymerization reactions, and the diluent and solvent recycled.

The reaction mixture, free of dissolved catalyst, diluent, and solvent, may then be fractionated to separate the light polymer product from the heavy polymer product. Suitable temperatures and pressures of fractionation may be employed and the particular temperatures and pressures to be employed will depend upon the viscosity of the light polymer product. Generally, a bottoms temperature of about 430° F. and a pressure of about 3 millimeters of mercury will be found to be satisfactory. Selection of other suitable temperatures and pressures for the separation of light and heavy products may be readily made by those skilled in the art.

The polymer product obtained from the reaction stage employing complex as the catalyst, after removal of the complex, is treated with clay to remove any unsettled complex or any dissolved catalyst that may be present. Thereafter, diluent may be removed by stripping and recycled. If desired, the reaction products from the complex-catalyzed reaction may be admixed with the reaction products from the low and high temperature stages of the reaction. Where this is done, of course, the complex-catalyzed reaction must be carried out under such conditions as to give a polymer product having a viscosity similar to the viscosity of the product produced in the high temperature stage of the reaction. The admixed products may then be freed from complex, washed with water, caustic, or alcohol, where such treatment is employed, clay-treated, stripped of solvent and diluent, and the polymer fractionated. Where this procedure of admixture is employed, a portion of the complex removed by settling may be used for complex-catalyzed polymerization and the remainder treated for recovery of the catalyst therefrom. Also, if desired, the reaction products from the complex-catalyzed polymerization may be first treated to settle out the complex and thereafter the products may be admixed with the products from the low and high temperature stages for washing, clay-treating, removal of solvent and diluent, and fractionation. This latter procedure, if admixture is desired, is preferable to the former since the complex removed from the complex-catalyzed polymerization reaction products is low in activity and is preferably sent to regeneration rather than admixed with the complex from the low and high temperature stages for further polymerization.

The polymer products obtained by low temperature polymerization, when propene, isobutene, 1-butene, 1-pentene, etc., are employed, are suitable as lubricating oils, lubricating oil addition agents, etc. The high temperature polymerization products from these olefins and those produced by complex-catalyzed polymerization are useful as light lubricating oils, lubricating oil addition agents, chemical intermediates, etc.

If desired, catalyst promoters may be employed to enhance the effect of the catalyst in the polymerization reactions. Suitable promoters are the hydogen halides such as hydrogen bromide and hydrogen chloride. Hydrogen bromide may be used as a promoter for aluminum bromide or ferric bromide catalyst and as a promoter for the complexes produced from these metal halides. Hydrogen chloride may be used as a promoter for aluminum chloride catalyst and for the complexes produced from aluminum chloride. Other suitable catalyst promoters known to the art may also be employed.

The accompanying drawing is a flowsheet illustrating one embodiment of the invention wherein aluminum bromide is employed for the polymerization of propene in the presence of liquid propane as a solvent and diluent.

Referring now to the drawing, aluminum bromide catalyst and liquid propane are passed into mixer 10, provided with stirrer 11, through lines 12 and 14, respectively, wherein the aluminum bromide is dissolved in the liquid propane. Sufficient propane is passed to mixer 10 to dissolve the aluminum bromide and provide the desired amount of diluent in the subsequent polymerization reaction. After solution has been effected, the solution is passed through line 15 to reactor 16. Propene is admitted to reactor 16 through line 17 and is intimately admixed with the aluminum bromide solution therein by means of stirrer 19. Sufficient pressure is maintained in the reactor to keep the hydrocarbons in the liquid phase. The polymerization reaction in reactor 16 is conducted at a low temperature to produce high viscosity polymer product and the desired low temperature may be maintained in the reactor by passage of a suitable cooling medium through jacket 20. Reaction mixture is continuously removed from the reactor, after a suitable residence time, through line 21.

The reaction mixture in line 21 contains aluminum bromide-hydrocarbon complex and the reaction mixture is passed to settler 22 where the complex settles out and is removed through line 24. The remainder of the reaction mixture is removed from the settler as overhead through line 25 and is passed to high temperature polymerization reactor 26 provided with stirrer 28. If desired, the reaction mixture in line 21 may be by-passed in whole or in part through line 29 to reactor 26 and removal of the complex contained therein postponed until after completion of the high temperature reaction.

Propene is passed into reactor 26 through line 30 and intimately stirred with the reaction mixture from the low temperature polymerization reaction. Proper temperature is maintained within reactor 26 by passage of a suitable temperature controlling medium through jacket 31 and the low temperature reaction mixture may be brought to the desired reaction temperature before entering the reactor by means of heater 32 in line 25. The reaction mixture is removed continuously after a suitable residence time through line 34 and passed to settler 35. The complex is removed through line 36, and the remainder of the reaction mixture is removed through line 37 and then passed through clay treater 39 for removal of any remaining complex or dissolved catalyst. Following treatment with clay, the reaction mixture is passed through line 40 to depropanizer 41 where propane is removed as overhead through line 42 and after condensation (not shown) recycled to polymerization reactor 10. Temperatures between 60° and 100° F., and pressures of 100–200 pounds per square inch gage are satisfactory for removal of the propane. The bottoms from depropanizer 41 comprising a mixture of the low and high viscosity products, are passed through line 42 to fractionator 44. High viscosity polymer is recovered as bottoms through line 45 and light viscosity polymer is recovered as overhead through line 46.

The complex in line 24 is admixed with the complex in line 36 and the mixture is passed to polymerization reactor 47 for complex-catalyzed polymerization of propene. Propene enters the reactor through line 49 in admixture with propane diluent entering through line 50. The reaction mixture is intimately stirred by means of stirrer 51 and the desired temperature is maintained by passage of suitable temperature controlling medium through jacket 52. The reaction mixture, after suitable residence time, is removed from the reactor through line 54, and passed to settler 55 for removal of spent complex. The complex is removed through line 56 and passed to a regeneration zone, indicated at 57, for removal of aluminum bromide from the complex. If desired, a portion of the complex in line 56 may be recycled to reactor 47 through line 59 connected with line 36. The regenerated aluminum bromide is removed from the regeneration zone through line 60 and recycled to line 12. Residue from the regeneration operation is removed through line 61.

The polymerization reaction mixture is removed from settler 55 through line 62 and passed to clay treater 64 for removal of any complex and dissolved aluminum bromide. The reaction mixture is then passed to depropanizer 65 through line 66 wherein the propane solvent is removed as overhead through line 67 and recycled to reactor 47 through line 67 while the light polymer product is removed as bottoms through line 69.

The reaction mixture in line 62 from settler 55 need not be treated in clay treater 64 but may, if desired, be admixed with the reaction mixture from reactor 26 by passing the mixture, or a portion thereof, from line 62 through line 70 to line 37. Where this procedure is followed, the mixture from line 70 will also be depropanized and fractionated with the mixture from reactor 26 and the light polymer products will be obtained together from fractionator 44 through line 46. Also, where this procedure is followed, recycle propane for the reaction in reactor 47 is provided by passing a portion of the recycle propane in line 42 through line 71 connected to line 67. Various other modifications in the procedure described may be made by those skilled in the art.

The following example will illustrate the results which may be obtained by the process of the invention.

*Example*

A propane-propene stream in the liquid phase was passed continuously into a stirring reactor, along with additional liquid propane and aluminum bromide catalyst dissolved in liquid propane, in quantities such that the mol ratio of propene to total propane was 1 to 4 and the weight per cent of aluminum bromide based upon the propane was 1.3. The temperture of the reaction mixture was maintained at −30° C. Reaction mixture was continuously withdrawn from the reactor after a residence time of 12 minutes and passed to a second stirring reactor. Prior to entering the second reactor the reaction mixture was heated, and a temperature of 60° C. was maintained in the second reactor. Liquid propane-propene stream was passed continuously into the second reactor in quantity such that mol ratio of propene to total propane was 1 to 1. The weight per cent of aluminum bromide based on propane was 1.1, and a residence time of 12 minutes was maintained. The effluent from the second reactor was passed to a settler and the complex allowed to settle therefrom after which the propane was fractionated from the remainder of the mixture. The depropanized residue was then fractionated at a pressure of 3 mm. of mercury to obtain as overhead a lubricating oil fraction having a viscosity at 210° F. of 120 Saybolt Universal seconds, corresponding to a SAE grade of 60. The bottoms were a heavy polymer having a 210° F. viscosity in excess of 625 Saybolt Universal seconds.

The complex settled from the reaction mixture was admixed with about an equal volume of liquid propane and passed to a third stirring reactor to which liquid propane-propene stream was passed. Feed rate ratios were maintained at about 10 pounds of propene per pound of complex and the reaction mixture was maintained at a temperature of 30° C. The residence time was 15 minutes. Propane was removed from the reaction mixture and, after stripping at a maximum temperature of 430° F. and a pressure of 3 millimeters of mercury, a product having a 210° F. viscosity of 50 Saybolt Universal seconds was obtained.

Having thus described my invention it is to be understood that such description has been given by way of illustration and example only and not by way of limitation, reference for the latter purpose being had to the appended claims.

I claim:

1. A process for the polymerization of olefins comprising contacting an olefin with a solution of a metallic halide polymerization catalyst at a temperature below 0° C. in a first reaction zone to produce a viscous polymer product, removing reaction mixture from said reaction zone, removing catalyst-hydrocarbon complex from said reaction mixture, elevating the temperature of said reaction mixture, contacting said reaction mixture with further of said olefin in a second reaction zone at a temperature sufficiently elevated above 0° C. to produce a polymer product having a 210° F. viscosity not greater than about 125 Saybolt Universal seconds and at least 500 Saybolt Universal seconds less than the viscosity of said polymer product produced in said first reaction zone, removing reaction mixture from said second reaction zone, removing catalyst-hydrocarbon complex from said reaction mixture, removing polymer product from said reaction mixture, fractionating said polymer product into a high viscosity fraction and low viscosity fraction, contacting complex recovered from said reaction mixture from said first and second reaction zones in a third reaction zone with further of said olefin at a temperature above about 0° C. to produce further polymer product, removing reaction mixture from said third reaction zone, removing exhausted complex from said reaction mixture, recovering metallic halide catalyst from said exhausted complex, dissolving said recovered catalyst, recycling said solution of recovered catalyst to said first reaction zone, and recovering polymer product from said reaction mixture from said third reaction zone.

2. A process for the polymerization of olefins comprising contacting an olefin with a solution of a metallic halide polymerization catalyst at a temperature below 0° C. in a first reaction zone to produce a viscous polymer product, removing reaction mixture from said reaction zone, removing catalyst-hydrocarbon complex from said reaction mixture, elevating the temperature of said reaction mixture, contacting said reaction mixture with further of said olefin in a second reaction zone at a temperature sufficiently elevated above 0° C. to produce a polymer product having a 210° F. viscosity not greater than about 125 Saybolt Universal seconds and at least 500 Saybolt Universal seconds less than the viscosity of said polymer product produced in said first reaction zone, removing reaction mixture from said second reaction zone, removing catalyst-hydrocarbon complex from said reaction mixture, removing polymer product from said reaction mixture, fractionating said polymer product into a high viscosity fraction and a low viscosity fraction, contacting complex recovered from said reaction mixture from said first and second reaction zones in a third reaction zone with further of said olefin at a temperature above about 0° C. to produce further polymer product, removing reaction mixture from said third reaction zone, and recovering polymer product from said reaction mixture from said third reaction zone.

3. A process for the polymerization of olefin comprising admixing an olefin with a solution of a solid metallic halide polymerization catalyst in a solvent at a temperature below 0° C. in a first reaction zone to produce viscous polymer product, removing reaction mixture comprising said polymer product and said solution of metallic halide polymerization catalyst from said reaction zone, maintaining said metallic halide polymerization catalyst in solution in said solvent and in admixture with said polymer product, transferring said reaction mixture to a second reaction zone, admixing further of said olefin with said reaction mixture in said second reaction zone at a temperature sufficiently elevated above 0° C. to produce polymer product having a 210° F. viscosity not greater than about 125 Saybolt Universal seconds and at least 500 Saybolt Universal seconds less than the viscosity of said polymer product produced in said first reaction zone, removing reaction mixture from said second reaction zone, removing catalyst-hydrocarbon complex from said reaction mixture, removing polymer product from said reaction mixture, fractionating said polymer product into a high viscosity and a low viscosity fraction, admixing said catalyst-hydrocarbon complex with further of said olefin in a third reaction zone at a temperature above 0° C. to produce further polymer product, removing reaction mixture from said third reaction zone, removing exhausted catalyst-hydrocarbon complex from said reaction mixture, recovering metallic halide catalyst from said exhausted complex, recycling said metallic halide catalyst solution to said first reaction zone, and recovering polymer product from said reaction mixture from said third reaction zone.

4. A process for the polymerization of olefin comprising admixing an olefin with a solution of a solid metallic halide polymerization catalyst in a solvent at a temperature below 0° C. in a first reaction zone to produce viscous polymer product, removing reaction mixture comprising said polymer product and said solution of metallic halide polymerization catalyst from said reaction zone, maintaining said metallic halide polymerization catalyst in solution in said solvent and in admixture with said polymer product, transferring said reaction mixture to a second reaction zone, admixing further of said olefin with said reaction mixture in said second reaction zone at a temperature sufficiently elevated above 0° C. to produce polymer product having a 210° F. viscosity not greater than about 125 Saybolt Universal seconds and at least 500 Saybolt Universal seconds less than the viscosity of said polymer product produced in said first reaction zone, removing reaction mixture from said second reaction zone, removing catalyst-hydrocarbon complex from said reaction mixture, admixing said catalyst-hydrocarbon complex with further of said olefin in a third reaction zone at a temperature sufficiently elevated above 0° C. to produce polymer product having a 210° F. viscosity not greater than about 125 Saybolt Universal seconds and at least 500 Saybolt Universal seconds less than the viscosity of said polymer product produced in said first reaction zone, removing exhausted complex from the reaction mixture from said third reaction zone, admixing the remainder of said reaction mixture from said third reaction zone with said reaction mixture from said second reaction zone, removing polymer product therefrom, and fractionating said polymer product into a high viscosity fraction and a low viscosity fraction.

DON R. CARMODY.

REFERENCES CITED

The following references are of record in the file of this patent:

UNITED STATES PATENTS

| Number | Name | Date |
|---|---|---|
| 2,139,038 | Russell | Dec. 6, 1938 |
| 2,219,867 | Gay | Oct. 29, 1940 |
| 2,278,445 | Hull | Apr. 7, 1942 |
| 2,331,429 | Sensel | Oct. 12, 1943 |

FOREIGN PATENTS

| Number | Country | Date |
|---|---|---|
| 472,553 | Great Britain | Sept. 27, 1937 |

Certificate of Correction

Patent No. 2,490,578                                                 December 6, 1949

DON R. CARMODY

It is hereby certified that errors appear in the printed specification of the above numbered patent requiring correction as follows:

Column 2, line 52, for "products an" read *products and*; column 5, line 16, after the word "complex" insert *and may be as low as 10 seconds for high activity complex*; column 6, line 28, for "hydogen" read *hydrogen*;

and that the said Letters Patent should be read with these corrections therein that the same may conform to the record of the case in the Patent Office.

Signed and sealed this 25th day of April, A. D. 1950.

[SEAL]

THOMAS F. MURPHY,
                                                                           *Assistant Commissioner of Patents.*